(12) United States Patent
Al-Shahri et al.

(10) Patent No.: US 11,481,413 B2
(45) Date of Patent: Oct. 25, 2022

(54) SYSTEMS AND METHODS FOR EVALUATING PETROLEUM DATA FOR AUTOMATED PROCESSES

(71) Applicant: Saudi Arabian Oil Company, Dhahran (SA)

(72) Inventors: Ali M. Al-Shahri, Doha (SA); Waqas Ahmed Khan, Khobar (SA); Nauman Aqeel, Dhahran (SA); Sualeh Hasan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 105 days.

(21) Appl. No.: 17/197,234

(22) Filed: Mar. 10, 2021

(65) Prior Publication Data

US 2021/0311966 A1    Oct. 7, 2021

Related U.S. Application Data

(60) Provisional application No. 63/006,352, filed on Apr. 7, 2020.

(51) Int. Cl.
*G06F 16/00* (2019.01)
*G06F 16/28* (2019.01)
(Continued)

(52) U.S. Cl.
CPC ........... *G06F 16/285* (2019.01); *G06F 17/18* (2013.01); *G06N 20/00* (2019.01)

(58) Field of Classification Search
CPC ....... G06F 16/285; G06F 17/18; G06N 20/00; G06N 5/003; E21B 2200/20;
(Continued)

(56) References Cited

U.S. PATENT DOCUMENTS 6,826,483 B1 * 11/2004 Anderson ................ G01V 1/30
                                                            702/14
8,918,430 B2 * 12/2014 Fischer ................... G06Q 10/06
                                                            707/793
(Continued)

FOREIGN PATENT DOCUMENTS

AU    2013200561 B2    2/2013
WO    2017044105 A1    3/2017
(Continued)

OTHER PUBLICATIONS

International Search Report and Written Opinion dated May 19, 2021 pertaining to International application No. PCT/US2021/023817 filed Mar. 24, 2021, 14 pages.
(Continued)

*Primary Examiner* — Noosha Arjomandi
(74) *Attorney, Agent, or Firm* — Dinsmore & Shohl LLP

(57) ABSTRACT

In one embodiment, a method of processing petroleum extraction data includes receiving petroleum extraction data from one or more data sources, wherein the petroleum extraction data includes structured data and unstructured data, filtering the petroleum extraction data by applying one or more statistical methods to generate filtered petroleum extraction data including transactional data and non-transactional data, and verifying the filtered petroleum extraction data according to one or more attributes. The method further includes calculating one or more parameters from the transactional data at a first frequency and one or more parameters from the non-transactional data at a second frequency, and correlating the one or more parameters from the transactional data and the non-transactional data based on one or more attributes to generate correlated data. The method also includes aggregating and storing the correlated data in a data (Continued)

structure, and performing one or more analytic processes on the aggregated data.

20 Claims, 8 Drawing Sheets

(51) Int. Cl.
*G06F 17/18* (2006.01)
*G06N 20/00* (2019.01)
(58) Field of Classification Search
CPC ..... E21B 2200/22; E21B 41/00; G06Q 10/20; G06Q 50/02; G06Q 10/063
See application file for complete search history.

(56) References Cited

U.S. PATENT DOCUMENTS

| | | | |
|---|---|---|---|
| 9,957,781 B2 | 5/2018 | Vennelakanti et al. | |
| 10,100,619 B2 | 10/2018 | Ranjan et al. | |
| 10,329,881 B1* | 6/2019 | Saleri | E21B 49/00 |
| 10,552,391 B2 | 2/2020 | Paulk et al. | |
| 11,263,268 B1* | 3/2022 | Bourbie | G06F 16/2228 |
| 11,269,871 B1* | 3/2022 | Bigdelu | G06F 16/2428 |
| 11,386,158 B1* | 7/2022 | Bourbie | G06F 16/9035 |
| 11,392,847 B1* | 7/2022 | Abdollahian | G06N 7/005 |
| 11,411,966 B2* | 8/2022 | Muddu | H04L 63/06 |
| 2009/0234533 A1* | 9/2009 | Trinkner | F01M 11/10 702/55 |
| 2011/0071963 A1 | 3/2011 | Piovesan et al. | |
| 2013/0096896 A1 | 4/2013 | Al-Shahri | |
| 2015/0213380 A1 | 7/2015 | Cooper et al. | |
| 2015/0278407 A1 | 10/2015 | Vennelakanti et al. | |
| 2016/0247089 A1* | 8/2016 | Zhao | G06N 20/00 |
| 2017/0335665 A1* | 11/2017 | Saleri | E21B 47/00 |
| 2017/0364795 A1* | 12/2017 | Anderson | G06N 20/10 |
| 2018/0038204 A1 | 2/2018 | Khan et al. | |
| 2019/0188192 A1* | 6/2019 | Hayes | G06F 16/2462 |
| 2019/0339687 A1* | 11/2019 | Cella | G06N 3/0454 |
| 2019/0370690 A1* | 12/2019 | Anderson | G06N 20/10 |
| 2020/0334577 A1* | 10/2020 | Anderson | G06Q 50/02 |
| 2021/0102893 A1* | 4/2021 | Li | G01N 21/85 |
| 2021/0272038 A1* | 9/2021 | Kowolenko | G06F 40/242 |
| 2021/0293992 A1* | 9/2021 | Ayub | G06N 3/0427 |
| 2022/0058172 A1* | 2/2022 | John | G06N 20/00 |
| 2022/0067249 A1* | 3/2022 | Steingrimsson | G06F 30/28 |

FOREIGN PATENT DOCUMENTS

| | | |
|---|---|---|
| WO | 2017135972 A1 | 8/2017 |
| WO | 2019051435 A1 | 3/2019 |

OTHER PUBLICATIONS

Win With Drilling Info, "Dynamic Subsurface Models to Accelerate Time-to-Decision and Quantify Results", https://www.enverus.com/wp-content/uploads/2015/12/BR_DI-Corporate-webEmail.pdf, May 25, 2020.

Hand, "Digital Business from GE Oil & Gas Launches with Key Partnerships", https://www.automationworld.com/factory/iiot/blog/13314857/digital-business-from-ge-oil-gas-launches-with-key-partnerships, Jan. 29, 2016.

* cited by examiner

SYSTEMS AND METHODS FOR EVALUATING PETROLEUM DATA FOR AUTOMATED PROCESSES

CROSS-REFERENCE TO RELATED APPLICATIONS

This application claims the benefit of priority under 35 U.S.C. § 119 to U.S. Provisional Application No. 63/006,352, filed on Apr. 7, 2020 and entitled "PETROLEUM ENGINEERING 4.0, AN INTEGRATED PLATFORM FOR SURFACE AND SUBSURFACE HOLISTIC DATA ANALYTICS AND DECISION ADVISORIES," the contents of which are hereby incorporated by reference in its entirety.

BACKGROUND

One of the biggest challenges the oil and gas industry faces today is making data available to decision-makers across disciplines in a way that allows everyone to benefit from it. Data is typically sourced, sorted and stored in proponent centric systems, where the information is most often used to make immediate, single point decisions on isolated tasks. In addition, it is mostly not filtered or analyzed to reveal new insights for informed proactive decision-making. Additionally, engineers are required to gather data from the disparate sources and make their own calculations, which leads to non-uniformity and inherently slow processes.

SUMMARY

Embodiments of the present disclosure are directed to systems and methods for evaluating petroleum extraction data.

In one embodiment, a method of processing petroleum extraction data includes receiving, by a processor, petroleum extraction data from one or more data sources, wherein the petroleum extraction data includes structured data and unstructured data, filtering the petroleum extraction data by applying one or more statistical methods to generate filtered petroleum extraction data including transactional data and non-transactional data, and verifying the filtered petroleum extraction data according to one or more attributes. The method further includes calculating one or more parameters from the transactional data at a first frequency and one or more parameters from the non-transactional data at a second frequency, wherein the first frequency is different from the second frequency, and correlating the one or more parameters from the transactional data and the non-transactional data based on one or more attributes to generate correlated data. The method also includes aggregating and storing the correlated data in a data structure as aggregated data, performing one or more analytic processes on the aggregated data, and displaying, on an electronic display device, a visualization based at least in part on the one or more analytic processes.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE DISCLOSURE

Embodiments of the present disclosure are directed to systems and methods for receiving, processing and evaluating petroleum extraction data. The systems and methods described herein provide for a major breakthrough in overcoming the challenges identified above by delivering enhanced insights from connecting an organization's diverse data sources with analytics capabilities to create a holistic view of the entire portfolio in a predictive setting, from functional details to aggregated impact, involving reservoir, well and surface equipment.

Embodiments perform oil and gas holistic data analytics (both surface and subsurface) based on a consistent set of workflows and provide actionable insights and decision advisories based on pre-defined logic guided by domain knowledge. The systems and methods described herein seamlessly read trillions of bytes of diverse range of data from data repository and reservoir models, it then automatically integrates the data and populates analytical modules pertaining to a vast range of petroleum production and reservoir engineering processes.

The analytical modules disclosed herein are based on logics and intelligent workflows to perform 2D and 3D analytics for valuable insights on field, reservoir, and even the entire business's portfolio level in real time that generate potentially billions of dollars' worth of savings over the business planning cycle. The embodiments described herein saves significant time and resources by transforming ~80% of engineers' time (that was previously lost in data preparation) to generate business value, thus optimizing manpower efficiency and maximizing productivity.

Thus, embodiments simultaneously handle huge volume, variety, and veracity of data, integrate surface and subsurface spatial and temporal data, generate immersive visualizations, and provide business optimization insights as well as decision advisories in a unified setting based on artificial intelligence and machine learning workflows for almost an entire range of petroleum engineering business processes such as field development, reservoir management, surveillance planning, production optimization, facilities optimization, and reserves assessment.

Various embodiments for systems and methods of evaluating petroleum extraction data are described below.

Figure 1:
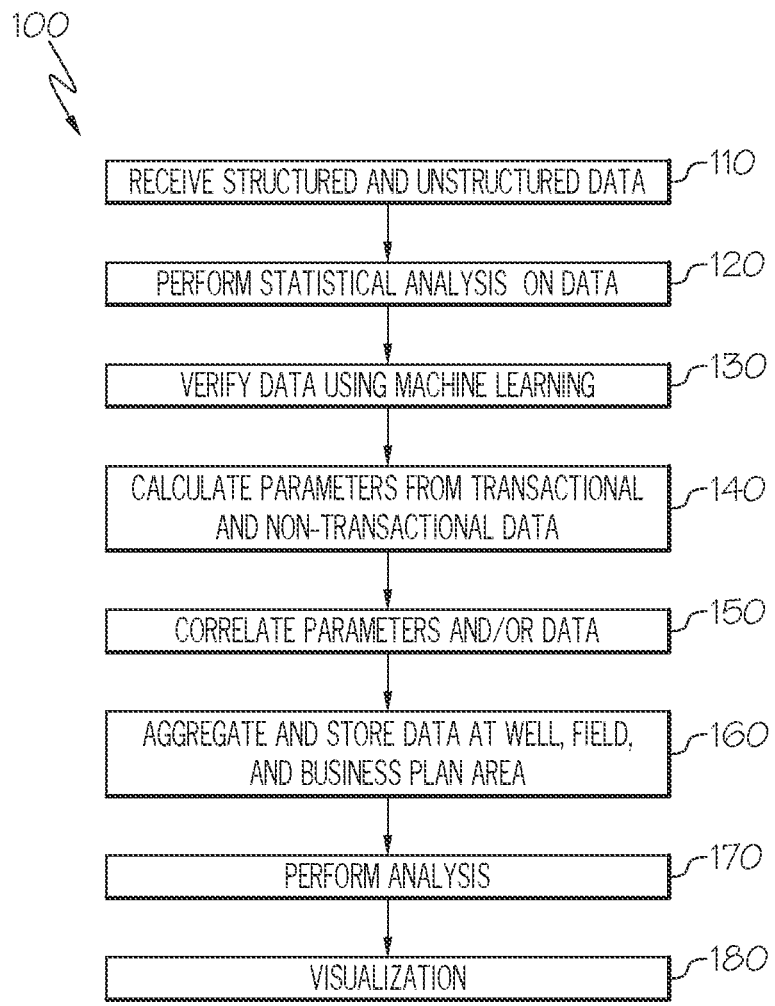
FIG. 1 is a flowchart of an example process of evaluating petroleum extraction data according to one or more embodiments described and illustrated herein.
Figure 2:
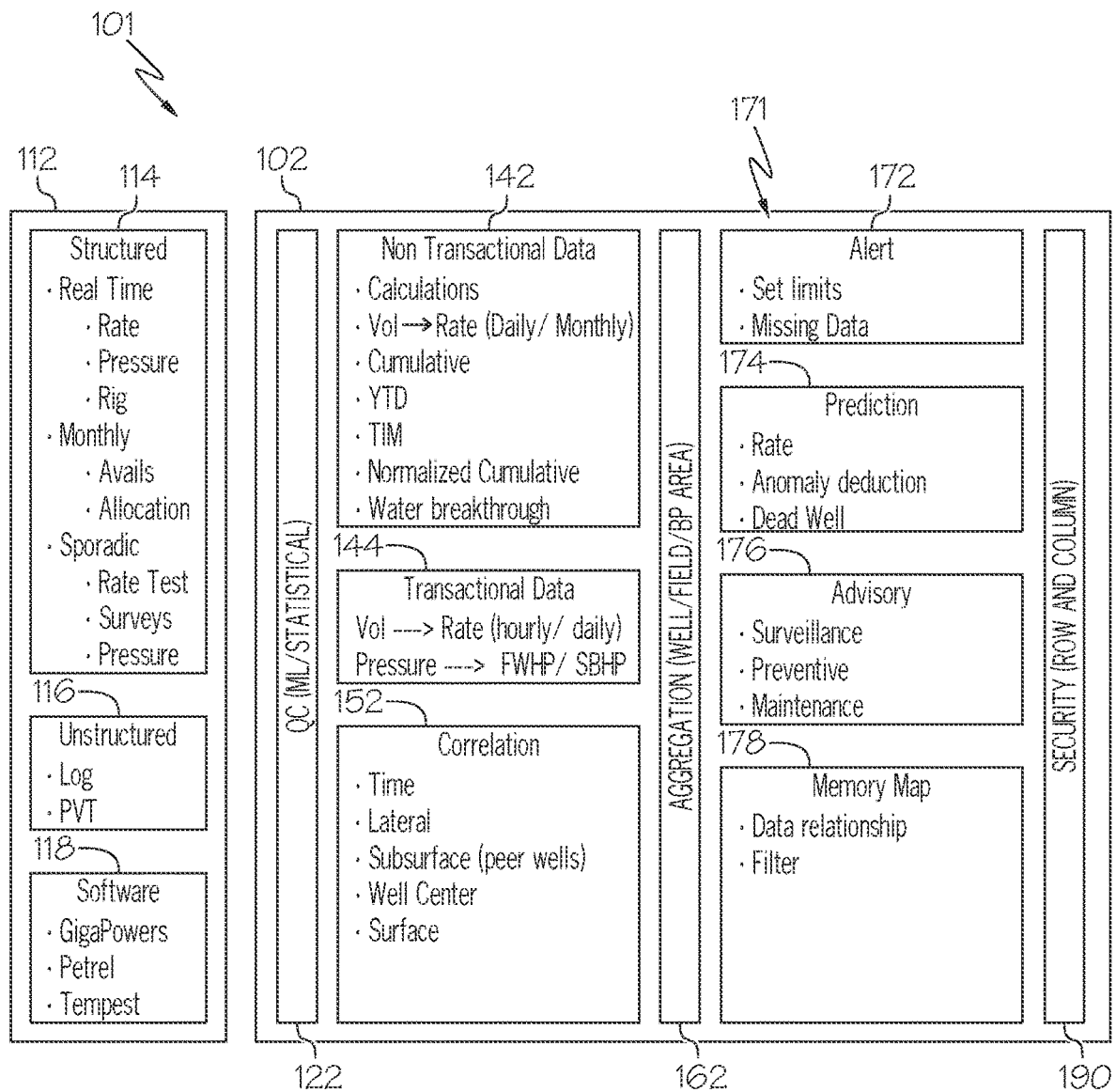
FIG. 2 is a chart of an example process of evaluating petroleum extraction data according to one or more embodiments described and illustrated herein.

FIG. 1 illustrates an example method 100 of processing petroleum extraction data and using the processed petroleum extraction data for downstream analytical processes. FIG. 2 is a chart 101 illustrating the data utilized by the example process of FIG. 1. At block 110, petroleum extraction data 112 is received from one or more sources. For example, a computing device configured to perform the functionalities described herein may have access to several data sources that include the petroleum extraction data 112. Many millions of data points may be received as the petroleum extraction data. The petroleum extraction data 112 includes both structured data 114 and unstructured data 116. The structured data 114 includes data that is provided in a structured format, such as in a table including cells or some other format. The structured data 114 may include any type of data, and may be received in any frequency. As a non-limiting example, the structured data 114 may include real-time data, daily data, monthly data, and sporadic data. The real-time data may include sensor data that is continuously monitored and stored, such as well production data (e.g., rate data, pressure data, and the like), and rig data. The rig data may include rig name, date the rig was put into production, previous coordinates of the rig and associated start and stop dates, current coordinates of the rig and the start date, type of rig, and any other relevant rig information.

Well production data may include the following:
Field Name
Reservoir Name
Well Name and Number
Unique Well Identifier (UWI)
Well Type
Fluid Produced
Crude Grade
Current Well Status
Date
Flowing Well Head Pressure
Well Operating Days
Monthly Oil Volume Produced
Monthly Water Volume Produced
Monthly Gas Volume Produced
Average Oil Rate
Average Water Rate
Average Gas Rate
Average Water Cut
Trailing Twelve Months Water Cut
Cumulative Oil Produced
Cumulative Water Produced
Cumulative Gas Produced Additionally, structured data may also include basic well data for each well, which may include, without limitation:
Unique Well Identifier (UWI)
UTMX coordinate
UTMY coordinate
Well Geometry
Well Spud Date
Completion Event Date
GOSP a well is associated to Monthly data is received on a monthly basis, and may include target production data and allocation data.

Sporadic data is structured data that is received not according to any frequency. Non-limiting examples of sporadic data includes rate test data from any rate tests that are performed on wells, pressure tests of wells, and survey data (e.g., logging data, annuli survey data).

Rate test data includes, but is not limited to the following:
Unique Well Identifier (UWI)
Test Date
Type
Validity Code
Total Flow Rate
Oil Flow Rate
Water Cut
GOR
FWHP
Choke Size Additional structure data may include:
Well Completion Data:
Unique Well Identifier (UWI)
Date of Last Completion Event
Facility Limits (Singe Value Per Field):
Field Oil Handling Facility Capacity
Field Water Handling Facility Capacity
Well Trajectories:
Unique Well Identifier (UWI)
X, Y and Z coordinates for each well As stated above, the unstructured data 116 is not provided in any consistent format. The unstructured data 116 may be provided in the form of a report, for example. One non-limiting example of unstructured data 116 is log data regarding wells, which may be received in an unstructured format, such as in a portable document format (PDF) where optical character recognition (OCR) is performed to extract the information. Non-limiting well log data includes (single value per well):
Unique Well Identifier (UWI)
Average Porosity
Average Permeability
Initial Average Water Saturation
Final Average Water Saturation
Porosity Thickness (PHIH)
Permeability Thickness (KH)
Initial Net Oil Colum
Final Net Oil Colum
Reservoir Contact
Net to Gross Initial
Net to Gross Final
Well Completion Zone
Oil Water Contact Another non-limiting example of unstructured data 116 is pressure-volume-temperature data of a well. It should be understood that other unstructured data may be inputted into the system.

In some embodiments, the unstructured data is preprocessed and stored in a structured format. For example, the unstructured data may be pre-processed and stored into a relational database, such as relational data bases for logs, reports, and the like. This pre-processing and storage of the unstructured data may be done in advance as the unstructured data arrives. In other embodiments, the processing of the unstructured data may be done in real-time on an as-needed basis.

Other petroleum extraction data 112 may include additional data provided by various software tools in the form of software data 118. The software data 118 may include structured and/or unstructured data. Non-limiting software tools that may provide software data 118 include GigaPowers™ by Saudi Aramco of Dhahran, Saudi Arabia, Petrel by Schlumberger of Houston, Tex., and Tempest by Emerson of St. Louis, Mo. The output from various software tools may be provided as input at block 110 of FIG. 1.

The input may also include three-dimensional model data. Non-limiting three-dimensional model properties include:
Porosity
Permeability
Saturation
Zones
Opportunity Index
Well Index (Unique Well Identifier (UWI)
Etc.

Each property in the three-dimensional model data may be available in a three-dimensional matrix (e.g., stored as binary filed). In some embodiments, the property values(s) from each cell are extracted and appended together in a tabular format where each row represents a cell value. Along with the property, the I, J and K index and the UTMX, UTMY and UTMZ location of each cell to provide a reference back to the three-dimensional model. This process may be performed for each property that is desired to be extracted from the three-dimensional model. As a non-limiting example, if the three-dimensional model matrix size (I, J, K) is (100, 100, 50), it will result in 500,000 rows of tabular two-dimensional data.

Now that the petroleum extraction data 112 is received, an analytics platform 102 (FIG. 2) processes the data for easy and fast retrieval, analysis and visualization. Generally, once the data is read and linked, the platform then relates all the tables of the various data types together to build relationships to derive valuable insights and apply practices and workflows.

At block 120 of FIG. 1, the received petroleum extraction data 112 is subjected to a quality control process 122 that comprises a statistical analysis. The received petroleum extraction data 112 includes various drilling and well attributes, such as rate data, pressure data, rig data, and the like. Some of this petroleum extraction data may be erroneous and should be filtered out before providing it to subsequent processes. By filtering erroneous data, computing resources may be saved and the computing time reduced. In one example, a standard deviation for each attribute is calculated using all of the petroleum extraction data or some sub-set of the petroleum extraction data. For example, a standard deviation for well rate may be calculated from the historical data of the well for which data is received. In another example, wells may be classified by several different factors, and a standard deviation for similar wells based on the factors may be generated. Rate data that is received by the system having a value that is greater than a defined threshold standard deviation may be excluded from the received petroleum extraction data. A non-limiting threshold standard deviation may be 1.5 or 2.0, for example. Moreover, various univariant and multivariant methods may be used to identify outliers. Embodiments are not limited by any threshold standard deviation, and it should be understood that other statistical methods of determining outlier data may be utilized.

Filtering erroneous data using statistical processes reduces the amount of data that needs to be processed. However, in some cases the attributes within the petroleum extraction data may be within the standard deviation yet may still be erroneous. The attributes of the petroleum extraction data correspond to one another, and should behave according to certain patterns. For example, a choke size is not decreasing or increasing as expected, or pressure and rate are not decreasing as expected to other well attributes. Additionally, supervised and unsupervised machine learning techniques may be used to clean data to ensure data integrity. As a non-limiting example, rate test data for any given date may be validated based on its historical performance and its correlation with pressure, water cut, choke size and other available attributes.

At block 130 of FIG. 1, the filtered petroleum extraction data is further verified, such as by a machine learning algorithm. As a non-limiting example, the machine learning algorithm may be an unsupervised learning algorithm that receives as input petroleum extraction data attributes, and clusters the petroleum extraction data based on learned features. The learned features may reflect how the various attributes interact with one another. Thus, the output of the machine learning algorithm may be a plurality of clusters representing the historical petroleum extraction data that was received as input. When new petroleum extraction data is received, the machine learning algorithm is applied to determine if and what cluster the new petroleum extraction data should assigned. If the new petroleum extraction data is erroneous, then it may not fit within any cluster of the plurality of clusters. As a non-limiting example, each cluster may have a mean value. If the new petroleum extraction data is not within a certain distance of the mean of any cluster, it may be flagged as erroneous and removed from the petroleum extraction data. It should be understood that any machine learning process may be applied to determine if any petroleum extraction data is erroneous or otherwise presents an anomaly.

Next, parameters are calculated from the attributes of the verified petroleum extraction data at block 140. As used herein "attributes" are values of the petroleum extraction data, and "parameters" are values calculated from the attributes. Particularly, parameters are calculated from transactional data and transactional data of the verified petroleum extraction data. The verified petroleum extraction data is first separated into the non-transactional data and the transactional data. As used herein, "transactional data" means data that has been approved within the workflow, or it has a master-child relationship. Transactional data is collected through various means, such as from equipment, surveys, and real-time equipment. Transactional data may be stored in different data stores, such as a relational database (e.g., an Oracle® relational database) or a data historian (e.g., the Pi System™ by OBIsoft of San Leandro, Calif.). As used herein, "non-transactional data" means an independent dataset without having any relationship with other data, i.e., a dataset that has all the required attributes to represent an entity. The system does not do any calculation or extract any information from other datasets for non-transactional data. Data is aggregated at different levels, and various calculations are performed before saving the data to make it completely independent from any relationship. The different levels may be well-level, field-level, plant-level, area-level, and others. One or more processes are periodically executed (e.g., overnight) to convert transactional data into non-transactional data stored in a flat database for downstream analysis. Data that is collected daily or hourly from real-time equipment is treated as transactional data on the day of collection. However, the next day it will become part of the non-transactional dataset.

The one or more periodic processes may perform calculations to derive parameters that are stored in the flat database(s). In some embodiments, the new data is stored without any relationships to ensure data integrity and for fast data retrieval.

Referring to block 142 of FIG. 2, parameters that are calculated from transactional data include daily volume, monthly volume, cumulative volume, year-to-date volume, trailing twelve months volume, normalized cumulative volume, and water breakthrough. These parameters may be calculated from the volume and day/time attribute, which may be received or collected from sensors at the well. These parameters may be calculated for all of the wells within a business plan area, or some sub-set of all of the wells within a business plan area.

Referring to block 144 of FIG. 2, parameters are calculated from transactional data. From the rate data in the transactional data, volume may be calculated, such as hourly volume and daily volume. Additionally, from the flowing well head pressure data in the transactional data, non-limiting parameters such as static bottom hole pressure and reservoir pressure may be calculated. Other transactional data parameters include, without limitation, year-to-date rate, and the trailing twelve months rate. It should be understood that other parameters may also be calculated from the transactional data.

The calculations of the parameters of the transactional data is done on the fly while the calculations of the parameters of the non-transactional data may be done daily or monthly. For example, the calculations of the parameters of the non-transactional data may be performed daily overnight, while the calculations of the parameters of the transactional data may be done as they are received from the sensors, or sporadically as transactional data is available. The daily calculations of the parameters of the non-transactional data at night ensures that the parameters are available for engineers the next day.

Next, the parameters and/or the attributes of the petroleum extraction data are correlated by several factors at block 150. Correlating the attributes enable the data including the parameters and/or the attributes to be sorted and organized by the factors. Referring to block 152 of FIG. 2, non-limiting factors include time (e.g., the time of the attribute as provided by a sensor, or a time of the parameter that is calculated), surface position (e.g., X,Y coordinates), subsurface position (e.g., X, Y, Z (depth) locations to identify similar peer wells), well center (e.g., the depth from the surface to a center of the well), and lateral of the main well. Thus, data reflecting these example factors are stored with (or otherwise associated with) the parameters and/or attributes of the petroleum extraction data. A user may request to see data reflecting all wells in a certain area, or all wells having a certain well center. The correlation enables such analysis and visualizations to be presented to the user in a graphical user interface.

At block 160 of FIG. 1 and block 162 of FIG. 2, the calculated parameters and/or the attributes of the filtered and verified petroleum extraction data is aggregated. Any method of aggregating may be utilized. The aggregation process may further reduce the volume of information that is needed to be stored and processed. As a non-limiting example, several values may be averaged together, and the average value is stored rather than all of the individual values. For example, a well may have ten pressure values. The system may take the average pressure value of the ten pressure values and store the average pressure value in a database that is used to perform the analytics.

Additionally at block 160 of FIG. 1 and block 162 of FIG. 2, attributes and/or parameters are aggregated at the well level, the field level, and the business plan level. Attributes and/or parameters are established for each well, such as by averaging the attributes and/or parameters as described above. To aggregate the attributes and/or parameters at the field level, all of the attributes and/or parameters of the individual wells of a specific field are summed and averaged. Thus, average values of the attributes and/or parameters for the wells of a specific field are determined. Similarly, all of the attributes and/or parameters of individual fields of a business plan area are summed and averaged to determine the attributes and/or parameters at the business plan level.

Figure 3:
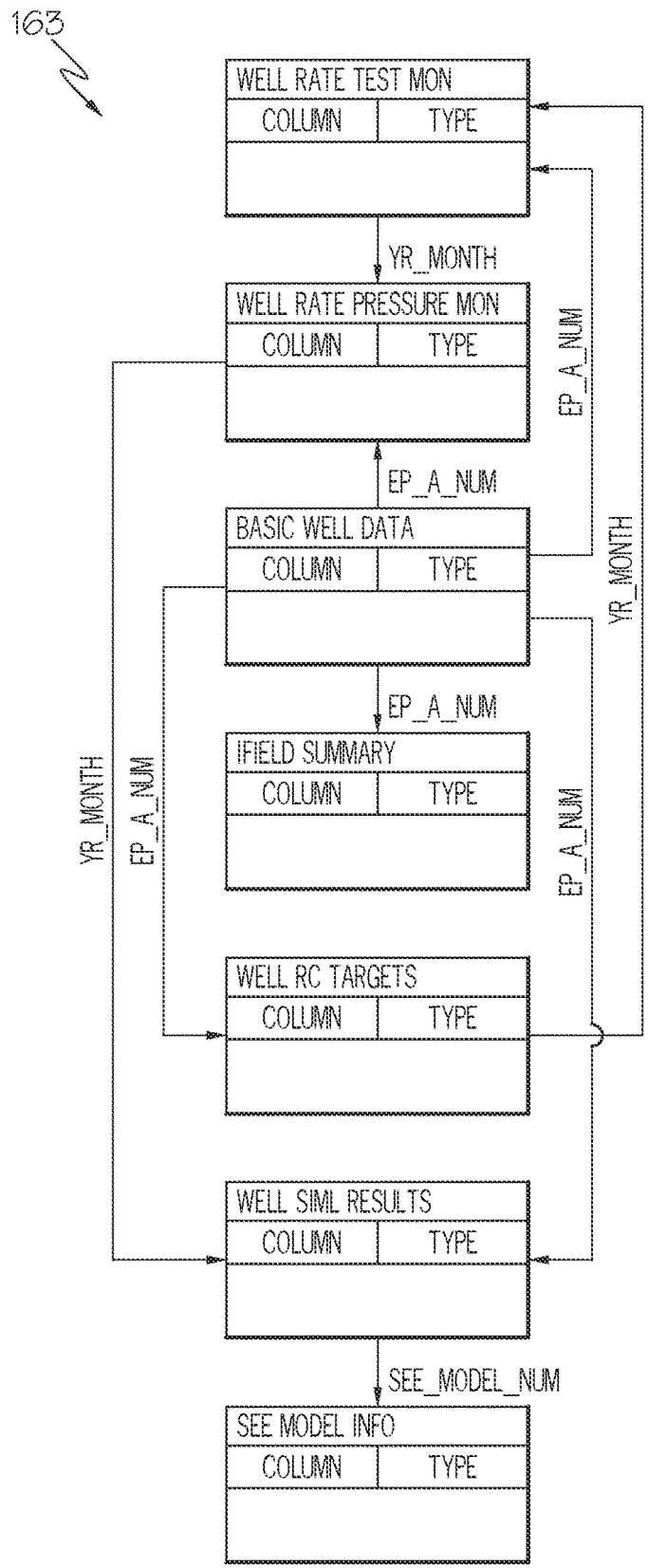
FIG. 3 graphically depicts an example flat database according to one or more embodiments described and illustrated herein.

The aggregated petroleum extraction data, which includes the aggregated attributes and/or the aggregated parameters, is then stored in a database. In some embodiments, the aggregated petroleum extraction data is stored in a flat data structure. FIG. 3 illustrates an example flat data structure comprising a plurality of tables, with each table corresponding to a particular property, and includes a plurality of attributes as records. The individual tables are linked by common attributes. It should be understood that FIG. 3 illustrates only a few tables, and that many additional tables may be used.

Now that the aggregated petroleum extraction data is stored in a data structure, it is ready to be utilized for data analytics and presentation of visualizations. At block 170 of FIG. 1, analysis is performed on the aggregated petroleum extraction data. Embodiments of the present disclosure are not limited by the type of analyses that may be performed. The analysis may occur on the back-end automatically (e.g., automated alerts), or by request received from a user interface. In addition to analysis, a user may use a user interface to retrieve and display the aggregated petroleum extraction data, either in textual form or graphical form.

Region 171 of FIG. 2 illustrates example analyses that may be performed. It should be understood that other analyses than those shown in FIG. 2 may be performed. Block 172 illustrates an example alert analysis. The alert analysis may run in the background and present alerts to users when undesirable conditions occur. For example, the user may set criterion for different attributes and/or parameters such that when a parameter or attribute does not satisfy a criteria, an alert is issued. As a non-limiting example, a user may set a pressure criterion for individual wells (e.g., a pressure threshold). When a well is showing a pressure value that does not satisfy the pressure criterion (e.g., exceeds a pressure threshold), an alert may be generated that indicates an abnormal pressure for the particular well. The alert may be displayed on an electronic display device, may be provided by a sound, and/or may be transmitted by SMS, for example.

Additionally, the system may also identify any missing data that should be present with respect to any well, field or business plan area. When missing data is identified, an alert may be generated to instruct a user to take action, such as add missing data or investigate the reason why data is missing. For example, the system may detect that a certain well did not report pressure for the last day. In such a case, an alert may be generated to instruct a user to find the cause as to why no pressure was reported. Automated alerts are also generated from the system. Historical data is clustered and averaged or summed value of several attributes that are calculated for each cluster. Whenever new data is collected, the system automatically determines the appropriate cluster and then compares its value with the cluster value. Depending upon the setting, the system generates alerts if data is not in given thresholds.

Block 174 of FIG. 2 illustrates example prediction analyses. The prediction analyses predict future values and conditions based on the existing aggregated petroleum extraction data. For example, the production rate in one month, two months, six months, and the like may be predicted based on historical rate data in the aggregated petroleum extraction data. Any attribute and/or parameter may be predicted. Any known or yet-to-be-developed machine learning methods may be used for prediction. As a non-limiting example, Decline Curve Analysis (DCA) may be used for rate prediction. An event-driven approach may be used for predictive maintenance for equipment. New data that arrives is analyzed in conjunction with historical data to identify abnormalities, such as abnormal well behavior, for example.

The prediction analyses may also include anomaly deduction. Aggregated petroleum extraction data may include anomalies, such as those described above with respect to data verification at block 122. For example, the aggregation of the correlated petroleum extraction data may present anomalies not present prior to the aggregation step. A machine learning algorithm (e.g., the same or different machine learning algorithm used to verify the filtered petroleum extraction data) to detect anomalies. For example, the machine learning algorithm may cluster the aggregated petroleum extraction data by learned features. Aggregated petroleum extraction data separated from a mean of any cluster by a distance greater than a threshold may be flagged as an anomaly. In some embodiments, the anomaly deduction is determined when aggregated petroleum extraction data is moving away from a particular cluster at a certain rate over time. This may be indicative of a future anomaly.

Embodiments may also predict when a well reaches the end of its life (i.e., a "dead well"). The historical aggregated petroleum extraction data is analyzed for trends that indicate when a well will reach its end-of-life. For example, historical data with respect to wells that have reached end-of-life. Trends of the attributes and/or parameters of such dead wells are learned by the system. In embodiments, well behavior is analyzed using machine learning methods to predict the likelihood that the well will be dead in the upcoming six months. Generally, when a well is reaching the end of its life, the oil rates and pressures drop and the water cut rises. These trends may also depend on how far or close the well is from crest and the well geometry. As a non-limiting example, supervised machine learning such as Random Forest may be used to predict and classify whether a well will be dead soon or not. To do this analysis, the model may be trained to learn from the trailing twelve months' history of well production data before it dies. Once trained, this model may be applied to wells on a monthly basis to predict if these wells are going to die soon based on the trained model.

Recent aggregated petroleum extraction data is analyzed to determine if it corresponds to the identified trends of dead wells.

Block 176 of FIG. 2 illustrates example advisory analyses. The advisory analyses provide tools for supplying recommendations and information to users of the system. An example advisory analysis includes a surveillance feature that reviews the aggregated petroleum extraction data and makes recommendations. As a non-limiting example, the surveillance feature may provide recommendations regarding future well drilling and planning. Additional information regarding the surveillance feature is described below with reference to FIG. 3.

The advisory analysis may also include a preventative maintenance feature that predicts when preventative maintenance, such as preventative maintenance regarding rig equipment, is needed. In some embodiments, the preventative maintenance feature predicts when equipment will fail, or is likely to fail. For example, trends in the aggregated petroleum extraction data associated with equipment failure may be learned over time. When recent aggregated petroleum extraction data exhibits the trends associated with equipment failure, a preventative maintenance recommendation may be issued.

The trends may be learned by human operators and written into the software code of the preventative maintenance feature. For example, if pressure and rate change at a certain rate over time, it may be indicative of the failure of a certain piece of equipment. This trend may be written into the software code to be compared against incoming aggregated petroleum extraction data.

As another example, a machine learning algorithm may be used to learn features associated with equipment failure. As a non-limiting example, a supervised machine learning algorithm may be trained by inputting petroleum extraction data associated with equipment that is failed. The machine learning algorithm then learns features associated with the aggregated petroleum extraction data relating to wells and equipment that have failed. Thus, trends in the aggregated petroleum extraction data that lead to equipment failure may be automatically learned. These trends may then be compared to incoming aggregated petroleum extraction data and, when there is a match, a type of equipment relating to the trend may be identified and a preventative maintenance recommendation may be issued. Thus, equipment may be replaced before there is a failure.

Block 178 illustrates a memory map. Petroleum data has several standard values that are known as look up values. For example, well type can be single lateral, vertical, horizontal, etc. Similarly, there are standard values for other various attributes. Not all permutations and combinations of these attributes are valid. The memory map is used to find relationships between the data. In embodiments, the system automatically identifies the valid relationships among the attributes. For example, wells in a specific field can only be vertical and be a producer. Memory map determines these kinds of a relationship automatically from the data and helps users to discover data faster instead of using the traditional heuristic approach.

The relationships of the memory map may be used to make recommendations to a user. For example, a user may select one equipment or reservoir in a user interface, and the system will provide information regarding a related field. On selection of one attribute, the system automatically eliminates invalid relationships in the data. This way, the user will always have valid attributes available displayed on the user interface to filter data. The relationships of the memory map may be used to make recommendations to a user. For example, a user may select one equipment or reservoir in a user interface, and the system will provide information regarding a related field.

Figure 4A:
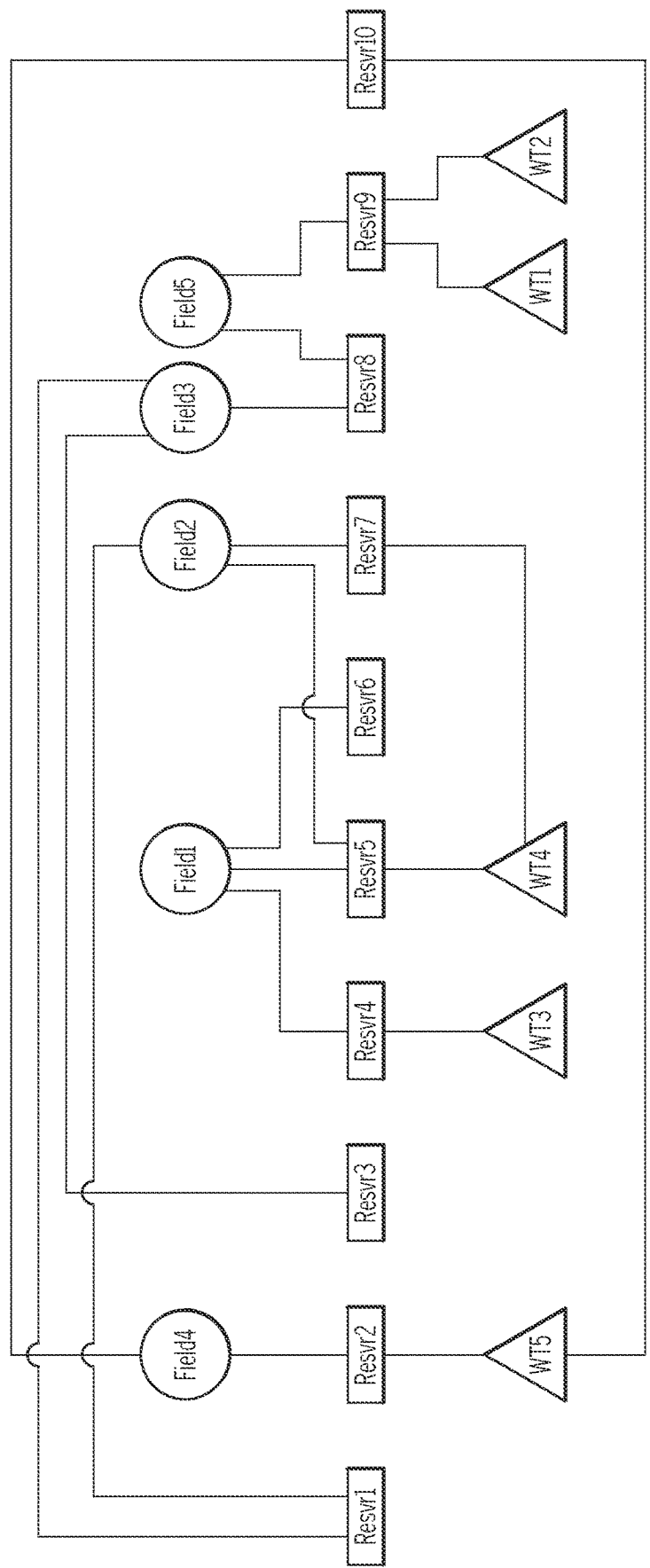
FIG. 4A graphically depicts an example memory map according to one or more embodiments described and illustrated herein.
Figure 4B:
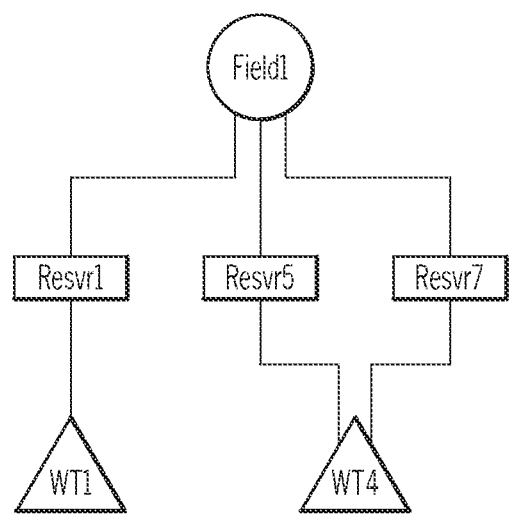
FIG. 4B graphically depicts the example memory map after a selection according to one or more embodiments described and illustrated herein.

FIG. 4A illustrates an example memory map 179 showing the relationships between a plurality of fields (ovals), reservoirs (rectangles) and wells (triangles). As an example, reservoirs Resvr1, Resvr5, and Resvr7 are within field Field2, and well WT1 is within reservoir Resvr1 and well WT4 is within reservoirs Resvr5 and Resvr7. FIG. 4B illustrates that a user has selected field Field2, which causes only the valid attributes to be available, and all other attributes of the memory map are removed.

In some embodiments, a security layer 190 is provided on the data structure of the aggregated petroleum extraction data. The security layer provides access to the aggregated petroleum extraction data based on assigned rights. Certain users of the system may have rights to only certain information of the aggregated petroleum extraction data. The rights may be established based upon rows and/or columns of the data. As a non-limiting example, one user may have rights to access only pressure data, or have rights to access data relating to certain fields. In this manner, access to the aggregated petroleum extraction data may be restricted.

Figure 5:
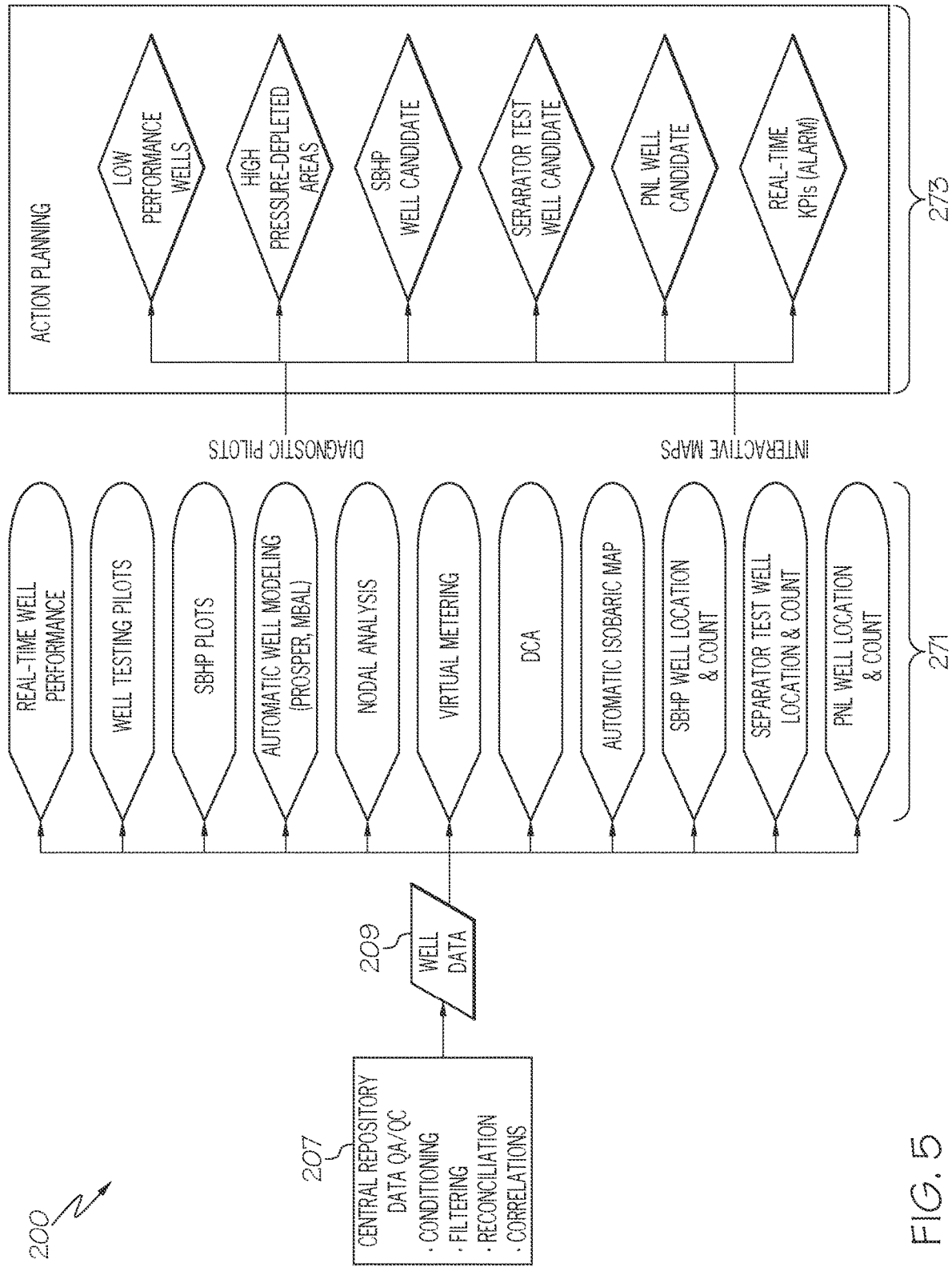
FIG. 5 is a process diagram of an example surveillance feature according to one or more embodiments described and illustrated herein.

Referring now to FIG. 5, a diagram 200 illustrating an example surveillance feature of the system is schematically illustrated. Block 207 represents the data intake, filtering, verifying, correlating, and aggregating processes of blocks 110, 120, 130, 140, 150, and 160 of FIG. 1. Block 209 represents the aggregated petroleum extraction data on which analyses are performed.

One form of analysis provided by the system is the generation and display of various diagnostic plots and maps 271. These diagnostic plots and maps may be called up by the user and displayed within a graphical user interface displayed on an electronic display device. Non-limiting diagnostic plots include:

real-time well performance;
well testing plots;
static bottom-hole pressure (SBHP) plots;
virtual metering plots; and
decline curve analysis plots.
Non-limiting example interactive maps include:
automatic isobaric maps;
SBHP well location and count maps;
Separator test well location and count maps; and
pulsed neutron logging well location and count maps.

It should be understood that other diagnostic plots and maps may be generated and displayed. The maps described above are interactive in the sense that a user may click or otherwise select various wells to drill down or expand out as desired.

The output of the diagnostic plots and interactive maps are provided to an action planning module that provides recommendations 273 to the user. The recommendations may include identifying low performing wells, high pressure depleted areas, SBHP well candidates, separator test well candidates, PNL well candidates, and real-time key performance indicators. These recommendations may be generated automatically, and may not require any input from the user. However, users may request particular recommendations, such as during the planning phase where reservoirs are to be drilled with new wells. Example recommendations and methods of their generation are described in U.S. patent application Ser. No. 17/095,833 filed Nov. 12, 2020, Ser. No. 17/073,802 filed Oct. 19, 2020, Ser. No. 17/069,306 filed Oct. 13, 2020, Ser. No. 17/097,379 filed Nov. 13, 2020, 63/022,863 filed May 11, 2020, Ser. No. 17/098,667 filed Nov. 16, 2020 and Ser. No. 17/098,693 filed Nov. 16, 2020, which are hereby incorporated by reference in their entireties.

Figure 6:
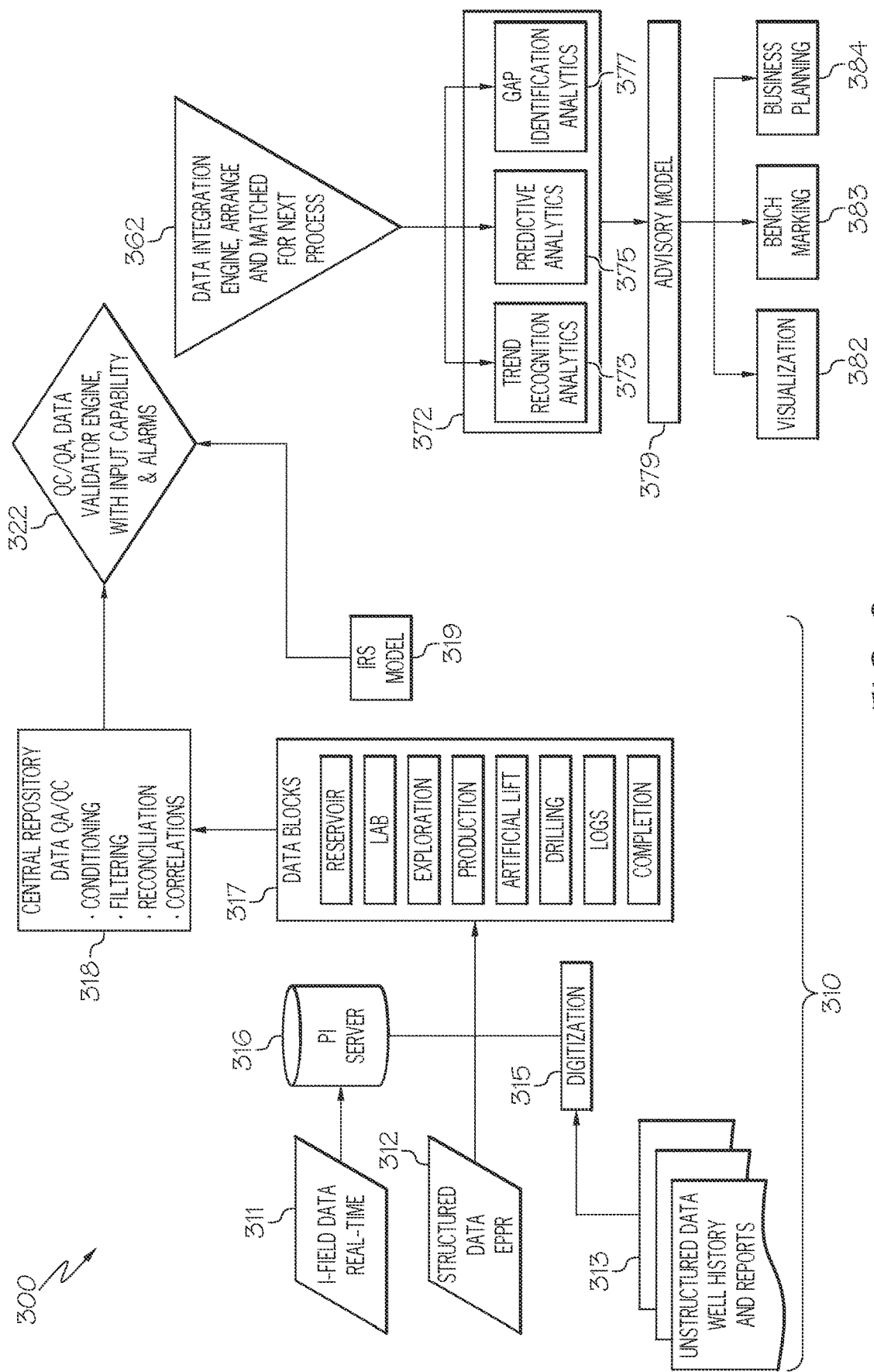
FIG. 6 is a process diagram of an example analytics feature according to one or more embodiments described and illustrated herein.

Referring now to FIG. 6, an analytics diagram is schematically illustrated. Blocks 310 represent the data intake, filtering, verifying, correlating, and aggregating processes of blocks 110, 120, 130, 140, 150, and 160 of FIG. 1. As stated above, various data is received from various data sources. Block 311 is I-field data, which is real-time data such as rate data, pressure data. The I-field data is stored in a real-time data repository 316, such as a PI server™ sold by OSIsoft of San Leandro, Calif. Block 312 is structured data, such as, without limitation, emergency, prevention, preparedness, and response data (EPPR). The structured data may include any data that is stored in a structured form. Block 313 is unstructured data, which is data that is not in a structured form. Non-limiting unstructured data includes well histories, reports, log data, and the like.

The digitized unstructured data, the structured data, and the real-time data is arranged into data blocks at block 317. Block 318 represents the filtering and correlating processes described above. In some embodiments, a simulation model 319 is also executed to produce simulation data for the attributes of the filtered and correlated petroleum extraction data. The simulation data may be linked with the filtered and correlated petroleum extraction data at block 322. Additionally, at block 322 the combined simulation data and the filtered and correlated petroleum extraction data may be verified using a machine learning algorithm, such as described above with respect to block 130 of FIG. 1 above.

Block 362 is a data integration engine, which arranges and matches data for the next processes. Block 372 illustrates the various analytic functionalities that may be performed on the data. Such analytic functionalities may include those described above with respect to FIG. 2. For example, the system may provide a trend recognition analytics function 373 that analyzes the aggregated petroleum extraction data for trends. The identified tends may be used to determine when wells have reached the end-of-life stage.

A predictive analytics function 375 may be used to predict future values and conditions based on the existing aggregated petroleum extraction data, such as described above with respect to block 172 of FIG. 2. Non-limiting examples include predicting subsurface flow profiles from surface production tests data, estimating flow rates from real time pressure temperature, monitoring continuous average reservoir pressure for flowing wells, and the like. The production rate in one month, two months, six months, and the like may be predicted based on historical rate data in the aggregated petroleum extraction data. Any attribute and/or parameter may be predicted. Non-limiting example predictive analytic functions are described in U.S. patent application Ser. No. 17/073,772 filed Oct. 19, 2020, 63/022,863 filed May 11, 2020, Ser. No. 17/074,735 filed Oct. 20, 2020, Ser. No. 17/098,667 filed Nov. 16, 2020 and Ser. No. 17/098,693 filed Nov. 16, 2020, which are hereby incorporated by reference in their entireties.

A gap identification analytics function 377 may also be provided. The gap identification analytics function 377 may be used to identify whether or not performance objectives are being met. For example, the aggregated petroleum extraction data may be analyzed and compared to previous predictions to determine overall performance. As a non-limiting example, an actual business plan area production rate may be compared to a previously calculated predicted business plan area production rate. Adjustments may be made to minimize any gap that is present between the current performance and an ideal, predicted performance.

In the example system of FIG. 6, the output of the analytic functionalities at block 372 is provided to an advisory module 379 that generates various advisories. The advisories that are generated may include those that are described above with respect to block 176 of FIG. 2. Non-limiting advisories include recommendations for future drilling and business planning, preventative maintenance recommendations, and the like. Additional example advisory functions are described in U.S. patent application Ser. No. 17/095,833 filed Nov. 12, 2020, Ser. No. 17/073,802 filed Oct. 19, 2020, Ser. No. 17/069,306 filed Oct. 13, 2020 and Ser. No. 17/097,379 filed Nov. 13, 2020.

The aggregated petroleum extraction data and the outputs of the advisory module 379 may be provided to a visualization module 382, a benchmarking module 383 and a business planning module 384. The visualization module 382 receives the aggregated petroleum extraction data and outputs of the advisory module 379 and generates plots and maps for display on an electronic display device to be viewed by a user. Any type of visualization may be generated and displayed. Non-limiting visualizations include one dimensional plots, two dimensional plots, and three-dimensional plots.

Figure 7:
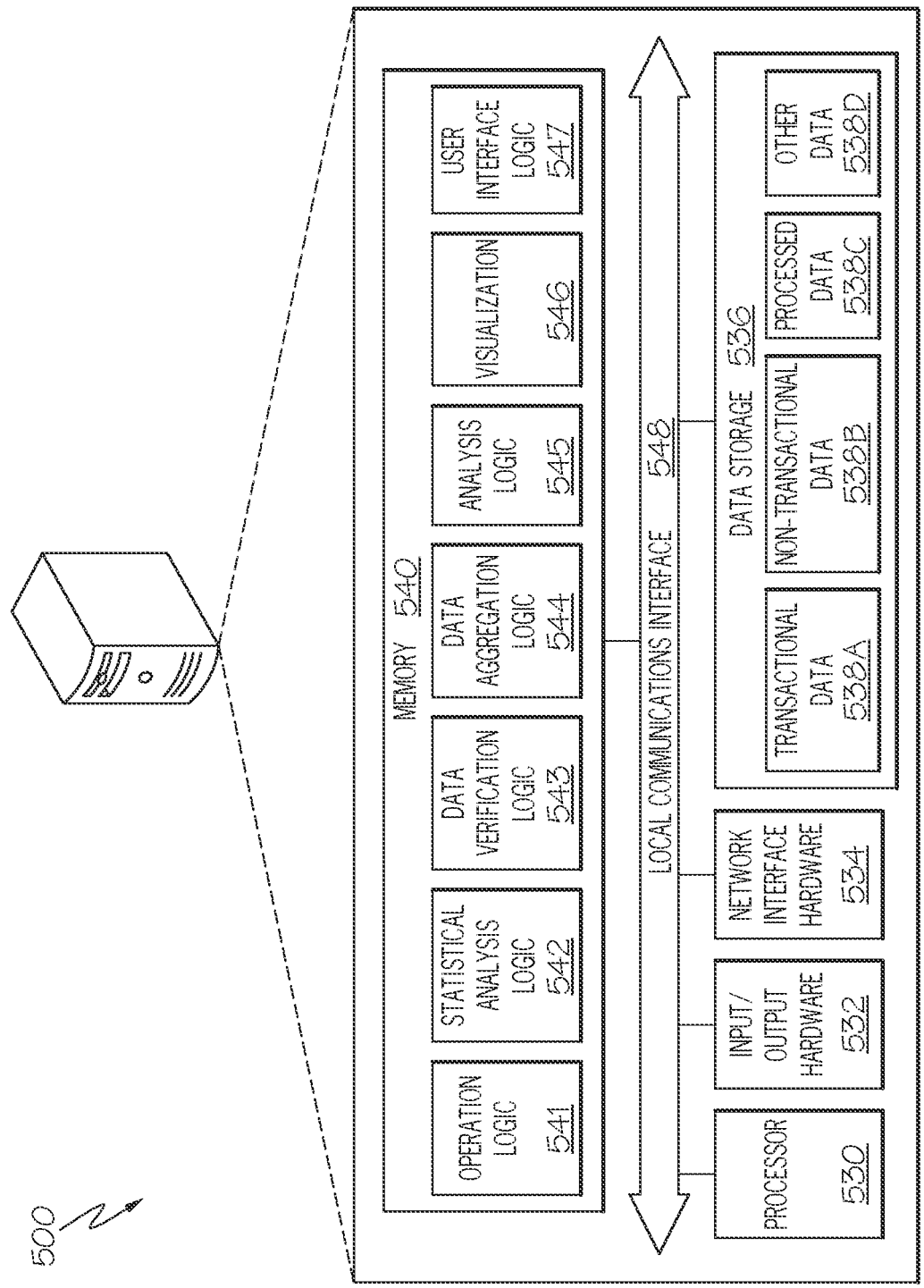
FIG. 7 illustrates an example computing device capable of performing the functionalities described herein.

Embodiments of the present disclosure may be implemented by a computing device, and may be embodied as computer-readable instructions stored on a non-transitory memory device. FIG. 7 depicts an example computing device 500 configured to perform the functionalities described herein. The example computing device 500 provides a system for receiving, aggregating and analyzing petroleum extraction data, and/or a non-transitory computer usable medium having computer readable program code for aggregating and analyzing petroleum extraction data embodied as hardware, software, and/or firmware, according to embodiments shown and described herein. While in some embodiments, the computing device 500 may be configured as a general purpose computer with the requisite hardware, software, and/or firmware, in some embodiments, the computing device 500 may be configured as a special purpose computer designed specifically for performing the functionality described herein. It should be understood that the software, hardware, and/or firmware components depicted in FIG. 7 may also be provided in other computing devices external to the computing device 500 (e.g., data storage devices, remote server computing devices, and the like).

As also illustrated in FIG. 7, the computing device 500 (or other additional computing devices) may include a processor 530, input/output hardware 532, network interface hardware 534, a data storage component 536 (which may store transactional data 538A, non-transactional data 538B, processed data 538C, and any other data 538D), and a non-transitory memory component 540. The memory component 540 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 540 may be configured to store operating logic 541, statistical analysis logic 542 configured to filter the received petroleum extraction data, data verification logic 543 configured to verify the filtered petroleum extraction data (e.g., by machine learning), data aggregation logic 544 configured to aggregate the verified data, analysis logic 545 configured to perform various analyses on the aggregated petroleum extraction data, visualization logic 546 configured to generate the various visualizations, and user interface logic 547 configured to generate and display the various user interfaces (each of which may be embodied as computer readable program code, firmware, or hardware, as an example). A local interface 548 is also included in FIG. 7 and may be implemented as a bus or other interface to facilitate communication among the components of the computing device 500.

The processor 530 may include any processing component configured to receive and execute computer readable code instructions (such as from the data storage component 536 and/or memory component 540). The input/output hardware 532 may include an electronic display device, keyboard, mouse, printer, camera, microphone, speaker, touchscreen, and/or other device for receiving, sending, and/or presenting data. The network interface hardware 534 may include any wired or wireless networking hardware, such as a modem, LAN port, wireless fidelity (Wi-Fi) card, WiMax card, mobile communications hardware, and/or other hardware for communicating with other networks and/or devices, such as to receive the transactional data 538A and the non-transactional data 538B from various sources, for example.

It should be understood that the data storage component 536 may reside local to and/or remote from the computing device 500, and may be configured to store one or more pieces of data for access by the computing device 500 and/or other components. As illustrated in FIG. 7, the data storage component 536 may include transactional data 538A, non-transactional data 538B and processed data, which may be the aggregated petroleum extraction data, for example. Other data 538D to perform the functionalities described herein may also be stored in the data storage component 536.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method of processing petroleum extraction data, the method comprising:
   receiving, by a processor, petroleum extraction data from one or more data sources, wherein the petroleum extraction data comprises structured data and unstructured data;
   filtering the petroleum extraction data by applying one or more statistical methods to generate filtered petroleum extraction data comprising transactional data and non-transactional data;
   verifying the filtered petroleum extraction data according to one or more attributes;
   calculating one or more parameters from the transactional data at a first frequency and one or more parameters from the non-transactional data at a second frequency, wherein the first frequency is different from the second frequency;
   correlating the one or more parameters from the transactional data and the non-transactional data based on one or more attributes to generate correlated data;
   aggregating and storing the correlated data in a data structure as aggregated data;
   performing one or more analytic processes on the aggregated data; and
   displaying, on an electronic display device, a visualization based at least in part on the one or more analytic processes.

2. The method of claim 1, wherein the structured data comprises real-time data.

3. The method of claim 2, wherein the real-time data comprises one or more of rate data, pressure data, and rig data.

4. The method of claim 2, wherein the structured data further comprises sporadic data.

5. The method of claim 4, wherein the sporadic data comprises one or more of rate test data, survey data, and pressure data.

6. The method of claim 1, wherein the unstructured data comprises log data and pressure-volume-temperature data.

7. The method of claim 1, wherein the one or more statistical methods comprises calculating a standard deviation for the one or more attributes, and removing outlier petroleum extraction data that have a standard deviation that exceeds a standard deviation threshold.

8. The method of claim 1, wherein verifying the filtered petroleum extraction data comprises:
learning, using a machine learning algorithm, features based on the one or more attributes;
clustering the filtered petroleum extraction data by the features into a plurality of clusters; and
identifying abnormal filtered petroleum extraction data not within a distance of a mean of at least one cluster.

9. The method of claim 8, wherein verifying the filtered petroleum extraction data comprises generating an alert regarding the abnormal filtered petroleum extraction data when the abnormal filtered petroleum extraction data is identified.

10. The method of claim 8, wherein verifying the filtered petroleum extraction data comprises removing the abnormal filtered petroleum extraction data from the filtered petroleum extraction data when the abnormal filtered petroleum extraction data is identified.

11. The method of claim 1, wherein the one or more attributes of the correlated data comprise at least one of time, lateral data, subsurface data, well center data, and surface data.

12. The method of claim 1, wherein aggregating and storing the correlated data in the data structure as the aggregated data comprises aggregating the correlated data on a well level, a field level, and a business plan area level.

13. The method of claim 1, wherein the one or more analytic processes comprises:
automatically comparing parameter values of the correlated data to one or more criterion; and
generating an alert when a parameter value of the parameter values do not satisfy the one or more criterion.

14. The method of claim 13, further comprising displaying the alert on the electronic display device.

15. The method of claim 1, wherein the one or more analytic processes comprises:
detecting one or more missing parameters in the aggregated data; and
generating an alert corresponding to the one or more missing parameters in the aggregated data.

16. The method of claim 15, wherein the one or more missing parameters corresponds to a parameter of an individual well.

17. The method of claim 1, wherein the one or more analytic processes comprises predicting a future value of the one or more parameters.

18. The method of claim 1, wherein the one or more analytic processes comprises detecting a preventative maintenance issue from the aggregated data.

19. The method of claim 1, wherein the visualization comprises one of a one dimensional visualization, a two dimensional visualization, and a three dimensional visualization.

20. The method of claim 19, further comprising receiving a selection from a user to switch between the one dimensional visualization, the two dimensional visualization, and the three dimensional visualization.

* * * * *